US005765522A

United States Patent [19]

Tagami

[11] Patent Number: 5,765,522

[45] Date of Patent: Jun. 16, 1998

[54] SOLENOID FOR STOPPING ENGINE

[75] Inventor: Hiroya Tagami, Sashima, Japan

[73] Assignee: Kyosan Denki Co., Ltd., Ibaraki-Ken, Japan

[21] Appl. No.: 826,662

[22] Filed: Apr. 7, 1997

[30] Foreign Application Priority Data

Apr. 30, 1996 [JP] Japan .................................... 8-134318

[51] Int. Cl.[6] ............................. F02B 77/00; F16K 31/02

[52] U.S. Cl. ............................... 123/198 DB; 251/129.15

[58] Field of Search ............................. 123/198 DB, 357, 123/359; 251/129.15

[56] References Cited

U.S. PATENT DOCUMENTS

| | | | |
|---|---|---|---|
| 4,863,143 | 9/1989 | Cowley et al. | 123/198 DB |
| 4,922,873 | 5/1990 | Gaeti | 123/198 BD |
| 5,379,733 | 1/1995 | Haddick et al. | 123/198 DB |
| 5,441,025 | 8/1995 | Ryberg | 123/198 DB |
| 5,549,084 | 8/1996 | Peterson, Jr. | 123/198 DB |

FOREIGN PATENT DOCUMENTS

A-56-110207 9/1981 Japan .

*Primary Examiner*—Thomas N. Moulis
*Attorney, Agent, or Firm*—Oliff & Berridge, PLC

[57] ABSTRACT

A low-cost solenoid is provided for stopping an engine, which reduces the possibility of the occurrence of damage, generates little noise due to impact and is of a simple structure. The solenoid includes a suction coil and a holding coil both located within a solenoid body. Current to the suction coil is shut off by means of the movement of a plunger. The solenoid further includes an end wall provided at one end of the solenoid body, a pin which slidably extends through the end wall, a fixed contact provided adjacent the end wall and a leaf-spring shape movable contact configured to be in contact with the fixed contact in a non-operating position of said plunger. When the plunger is brought into an operating position, it contacts the above-mentioned pin to release the contact between the movable contact and the fixed contact.

12 Claims, 5 Drawing Sheets

SOLENOID FOR STOPPING ENGINE

BACKGROUND OF THE INVENTION

1. Field of the Invention

The invention relates to a solenoid for stopping an engine and, more specifically, to a solenoid for preventing excessive fuel injection by cutting off fuel supply upon the stopping of a diesel engine.

2. Description of the Related Art

It is well known that despite turning off an ignition switch, revolution of the diesel engine will not come to an immediate stop due to inertia. Thus, fuel injection will not immediately cease since the injection operates synchronously with the engine revolution. For this reason, the diesel engine is provided with a fuel cut-off apparatus for moving a control rack to a position of no fuel injection upon turning off the ignition switch to stop the engine.

The conventionally known fuel cut-off apparatus comprises a solenoid including a suction coil for operating the control rack and a holding coil for maintaining the state of suction. Both the suction coil and holding coil operate and hold a plunger so as to control the position of the control rack. In general, power to the solenoid is turned on or off by operating the ignition switch of the engine.

However, the solenoid employed in the conventional fuel injection apparatus supplies a current to both the suction coil and the holding coil while operating a starting motor for the engine. In the case of normal starting, where revolution of the starting motor lasts for one to three seconds, no problems will arise. However, starting in cold areas may force the starting motor to run for a considerable period of time, possibly causing the solenoid to burn due to heat generated in the suction coil. That is, a large current has to flow through the suction coil in order to operate the control rack, while the holding coil provided solely for holding the plunger in place requires a comparatively small current. Therefore, if current should flow for a long time into the suction coil, which is receiving the large current, resultant heat generated may cause the solenoid to burn.

As a remedy for such a drawback, a fuel cut-off apparatus is generally used in which a timer and a relay are provided in an electric circuit to shut off any current flowing into the suction coil after the lapse of a preset time. However, inclusion of the timer and the relay in the known current shut-off device increases the cost.

There is another adverse factor, namely, a possibility of the current being shut off prior to completion of the plunger operation due to the power shutoff to the suction coil regardless of the completion status of the plunger operation. Hence, it is necessary to obtain at low cost a mechanism whereby the completion of the plunger operation is detected without failure prior to shutting off power to the suction coil.

There is another conventional solenoid, as disclosed in Japanese Patent Laid-Open No. 110207/81, having a first coil and a second coil. In this solenoid, a shaft with a movable switch is provided at one end of the plunger. The shaft is moved by the operation of the plunger and the switch on the shaft is turned off so as to shut off power to the first coil.

FIGS. 4 and 5 illustrate just such conventional solenoid 1 incorporating a first coil 2 and a second coil 3. At one end of a plunger 4, a shaft 5 is provided and a movable contact 6 is disposed on an end of the shaft 5. Prior to movement of the plunger 4, the movable contact 6 is in contact with a fixed contact 8 due to a pressure spring 7.

If a current is permitted to flow into the first coil 2 and the second coil 3, the plunger 4 will move causing the shaft 5 to move. This will result in detachment of the movable contact 6 from the fixed contact, thereby shutting off power to the first coil 2. As a result, the plunger 4 is maintained at one end of the solenoid by means of the second coil 3.

However, the conventionally known solenoid 1, as shown in FIGS. 4 and 5 above, has the following problems.

Namely, because the movable contact 6 is provided on the shaft 5, the pressure spring 7 for pressing the movable contact 6 against the fixed contact 8 must be installed separately, thus increasing the number of parts and cost. It is also necessary to provide fixing means for affixing the movable contact 6 to the shaft 5, resulting in a complicated structure and increasing the weight.

If the shaft 5 and the movable contact 6 are heavy, a large impact is likely to be induced when the plunger 4 for operating the shaft 5 and movable contact 6 collides, thereby creating a good possibility of generating damage as well as impacting sounds which may become the source of noise.

Moreover, as the shaft 5 and the movable contact 6 move further away from the set positions, the spring 9 for pushing the movable contact may suffer damage.

SUMMARY OF THE INVENTION

In view of the above-discussed problems associated with the conventially known solenoids, it is therefore an object of the invention to provide a low cost solenoid which will reduce the danger of the occurrence of damage, which will generate very little impact noise, and which will include a simple structure.

The invention, therefore, is a solenoid for stopping an engine and for shutting off a current to the suction coil by means of a plunger and includes a suction coil and a holding coil both located inside a solenoid body. The solenoid further comprises an end wall provided at one end of the solenoid body, a pin which slidably extends through the end wall, a fixed contact provided adjacent the end wall, and a leaf-spring shaped movable contact which contacts the fixed contact. The solenoid is configured such that, when the plunger comes into contact with the above-mentioned pin upon movement thereof, a contact between the movable contact and the fixed contact is released.

According to the invention structured and operated in a manner described above, the following effects are produced:

(1) because the pin and the leaf spring-shaped movable contact are the only parts operated by the plunger, there is less inertia, resulting in a small impact when the plunger contacts and operates the abovementioned parts. Consequently, damage will be less likely to occur and noise from impact will be reduced.

(2) as compared with the conventionally known solenoids designed such that the movable contact is on the end of the shaft, the preferred structure according to the invention requires a fewer number of parts, thus contributing to low cost. Further, since the pin and the leaf-spring shaped movable contact are the only parts operated by the plunger, the device is simpler and the weight of the entire apparatus is reduced.

BRIEF DESCRIPTION OF THE DRAWINGS

The foregoing and further objects, features, and advantages of the invention will become apparent from the following description of a preferred embodiment with reference to the accompanying drawings, wherein.

DETAILED DESCRIPTION OF A PREFERRED EMBODIMENT

Figure 1:
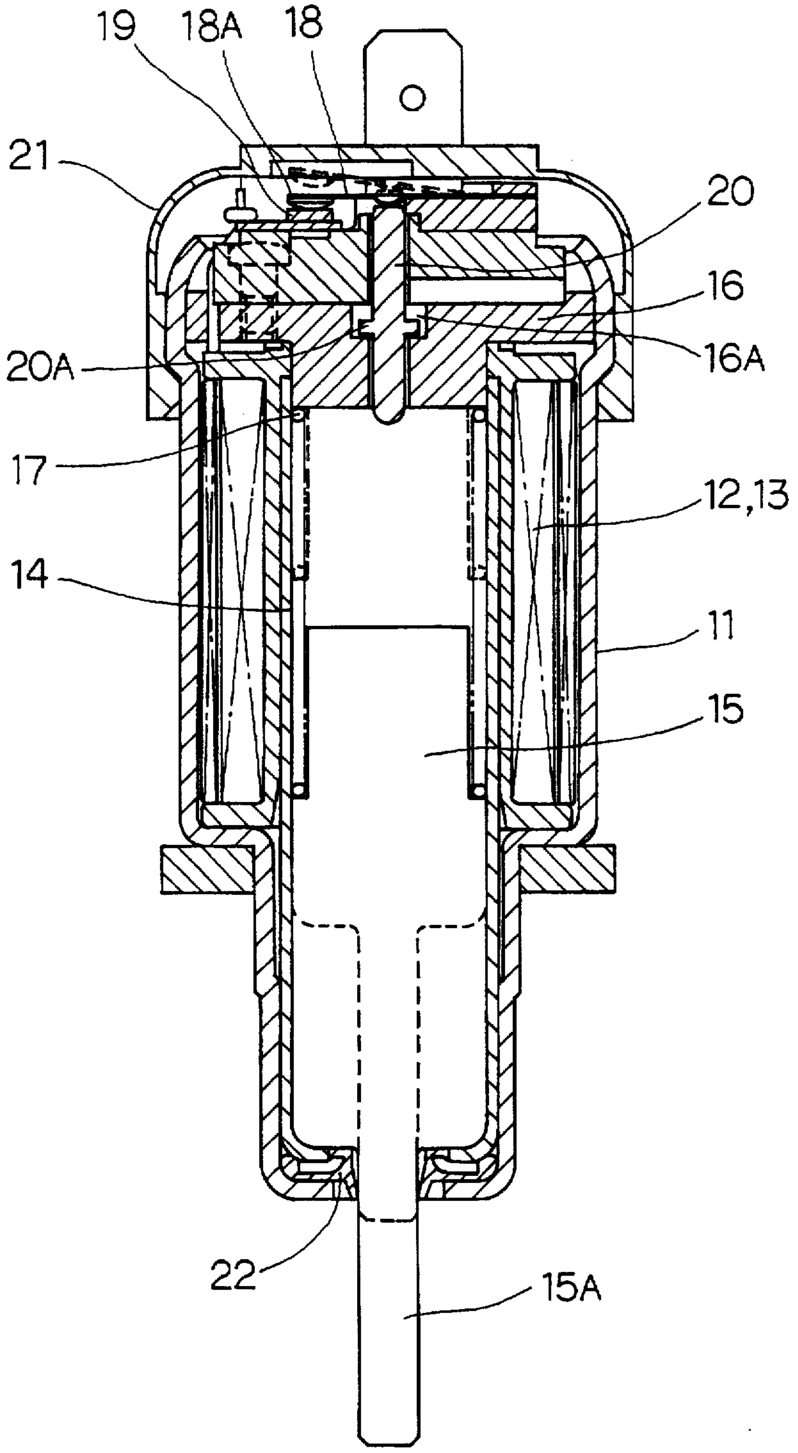
FIG. 1 is a sectional side view of a preferred embodiment of the invention illustrating a solenoid for stopping an engine.
Figure 2:
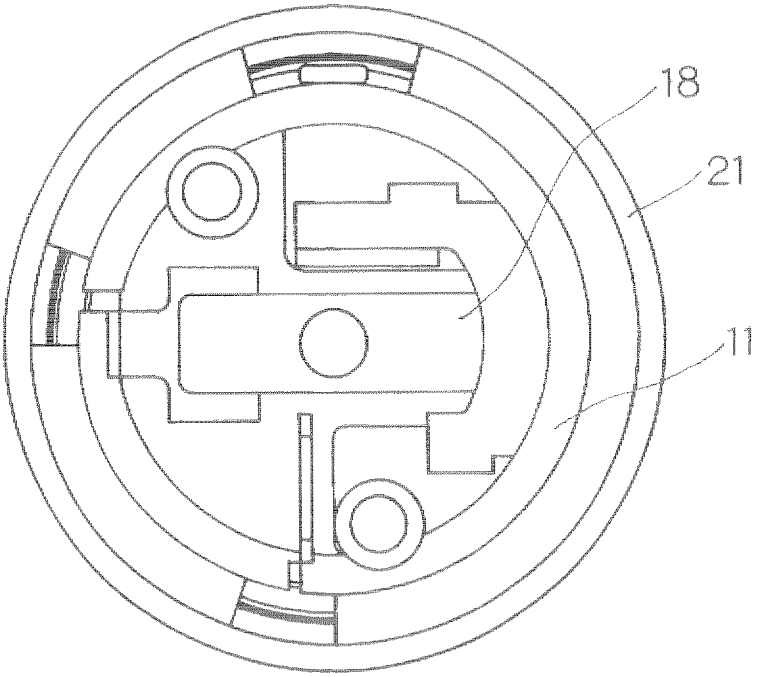
FIG. 2 is a plan view showing a movable contact of the solenoid valve of FIG. 1.
Figure 3:
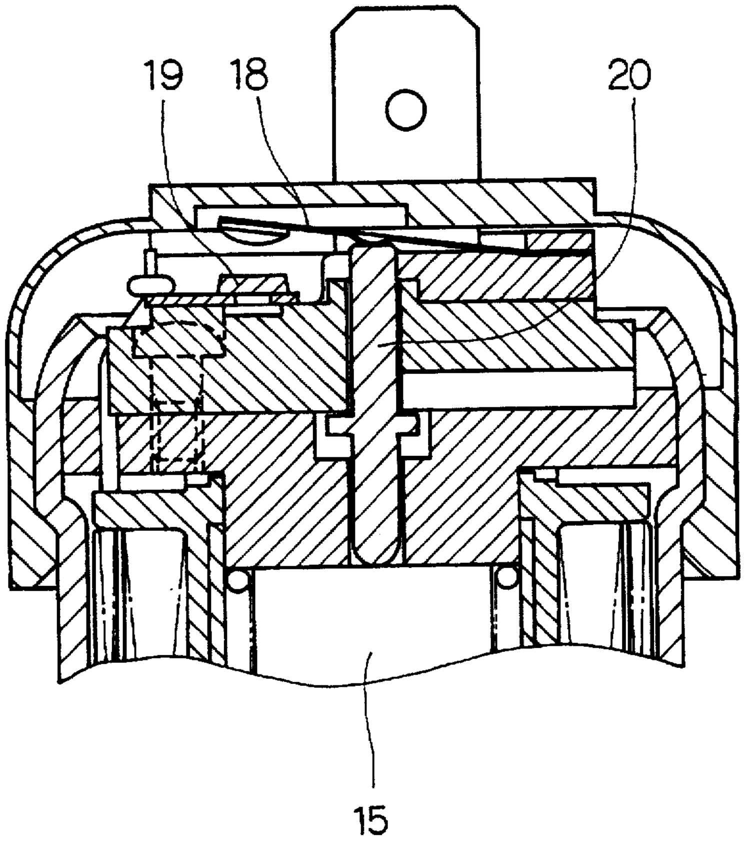
FIG. 3 is a partial sectional side view provided for the explanation of the function of the invention.
Figure 4:
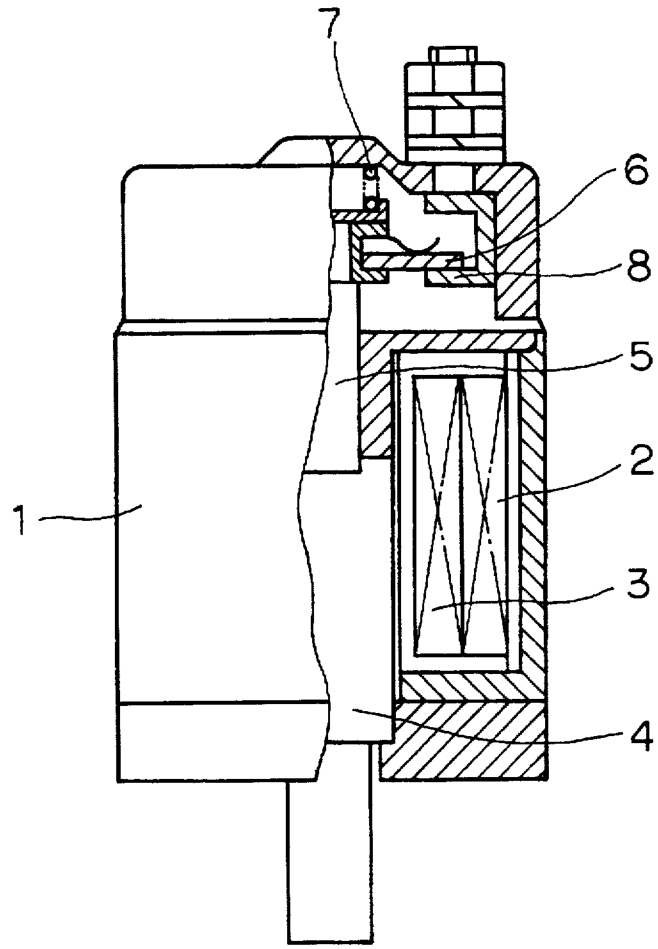
Fig. 4 PRIOR ART
FIG. 4 is a partial sectional side view of a conventional solenoid.
Figure 5:
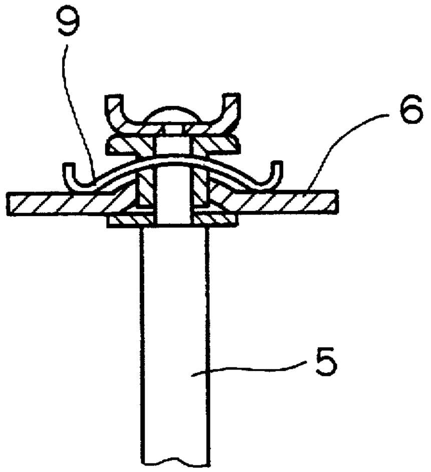
Fig. 5 PRIOR ART
FIG. 5 is a sectional side view of the shaft and a movable contact of FIG. 4.

Referring to FIGS. 1 through 3, a preferred embodiment of the invention will be explained in detail.

A suction coil 12 and a holding coil 13 are located within a solenoid body 11. The suction coil 12 and the holding coil 13 are of an integrated structure illustrated in the drawings as a one-piece coil. A cylinder 14 and a plunger 15, which slides inside the cylinder 14, are provided inside the one-piece coil. One end of the plunger 15 is formed as a thin shaft 15A protruding to the outside of the solenoid body 11 and connected to so as to move a control rack of a diesel engine (not illustrated).

An end wall 16 closes one end of the solenoid body 11, and a spring 17, which pushes and urges the plunger 15 toward an opposite end of the solenoid body 11, is disposed between the end wall 16 and the plunger 15. A movable contact 18 and a fixed contact 19 are provided adjacent the end wall 16. The movable contact 18 comprises a leaf-spring, on one end of which a contact 18A is formed. A pin 20 slidably extends through the end wall 16. The pin 20 comes into contact with the movable contact 18 when the plunger 15 is moved in the upward direction with respect to FIG. 1, thereby releasing contact between the movable contact 18 and the fixed contact 19.

A stopper 20A is formed on the pin 20. The stopper 20A is fitted into a recessed hole 16A provided in the end wall 16. A cover 21 is placed on the one end of the solenoid body 11. Also, an oil seal 22 is provided to seal a space between the shaft 15A of the plunger 15 and the solenoid body 11.

Referring to the solenoid according to the invention, the function thereof will now be explained.

FIG. 1 illustrates the solenoid in a position prior to the supply of a current to the coil. When a current is permitted to flow into the suction coil 12 and the holding coil 13, the plunger 15 is caused to move, sliding upward with respect to FIG. 1. When the end of the plunger 15 hits the pin 20, as shown in FIG. 3, the upper end of the pin 20 lifts the movable contact 18 and releases the contact between the movable contact 18 and the fixed contact 19. As a result, the current to the suction coil 12 is shut off, so that the plunger 15 is maintained in the position of FIG. 3 only by the holding coil 13.

Because the pin 20 and the leaf-spring shaped movable contact 18 are the only parts operated by the plunger 15 in the above-described operation, any inertia produced will be small and minimal noise will be generated upon contact.

Use of lightweight materials such as synthetic resin for the pin 20 in the above-mentioned structure would further reduce the inertia of the plunger 15, thus further reducing damage and noise due to contact.

While the invention has been described with reference to what is presently considered to be a preferred embodiment thereof, it is to be understood that the invention is intended to cover further various modifications and equivalent arrangements included within the spirit and scope of the appended claims.

What is claimed is:

1. A solenoid for stopping an engine, the solenoid including a suction coil and a holding coil located inside a solenoid body and shutting off a current to the suction coil by movement of a plunger, the solenoid comprising:
   - an end wall located at one end of the solenoid body;
   - a pin that slidably extends through said end wall;
   - a fixed contact provided adjacent said end wall; and
   - a movable contact formed in a shape of a leaf spring and configured to be in contact with said fixed contact in a nonoperating position of said plunger, said plunger coming into contact with said pin when operated to remove the contact between said movable contact and said fixed contact.

2. The solenoid according to claim 1, wherein a recessed hole is provided in said end wall and said pin includes a stopper, said stopper being fitted into said recessed hole.

3. The solenoid according to claim 1, wherein the pin is made of synthetic resin.

4. The solenoid according to claim 2, wherein the pin is made of synthetic resin.

5. A solenoid for stopping an engine, the solenoid comprising:
   - a solenoid body;
   - a suction coil and a holding coil located within said solenoid body;
   - a cylinder mounted within said solenoid body;
   - a plunger slidably provided within said cylinder;
   - an end wall provided at one end of said solenoid body to close said cylinder;
   - a pin, said pin slidably extending through a hole provided in said end wall;
   - a fixed contact provided adjacent said end wall; and
   - a movable contact configured to be in contact with said fixed contact in a non-operating position of said plunger, wherein in an operating position of said plunger, said plunger comes into contact with said pin and said pin forces said movable contact out of contact with said fixed contact.

6. The solenoid according to claim 5, wherein the suction coil and the holding coil are integrated as a onepiece coil surrounding said cylinder.

7. The solenoid according to claim 5, wherein said end wall comprises a recessed hole and said pin includes a stopper, said stopper being fitted into said recessed hole.

8. The solenoid according to claim 5, further comprising a spring disposed between said end wall and said plunger.

9. The solenoid according to claim 5, wherein said pin is made of synthetic resin.

10. The solenoid according to claim 5, wherein the plunger further comprises a shaft located at an end opposite to an end of said plunger that contacts said pin, said shaft being connected to a control rack of a diesel engine.

11. The solenoid of claims 5, wherein the end wall closes one end of said solenoid body and the solenoid further comprises a cover, said movable contact and said fixed contact being disposed between said end wall and said cover.

12. The solenoid according to claims 5, wherein said movable contact is a leaf-spring, on one end of which a contact is formed.

* * * * *